United States Patent [19]

Sansone

[11] Patent Number: 4,881,309
[45] Date of Patent: Nov. 21, 1989

[54] FLEXIBLE MACHINING SYSTEM

[75] Inventor: Reno D. Sansone, Watchung, N.J.

[73] Assignee: Wadell Equipment Company, Inc., Edison, N.J.

[21] Appl. No.: 122,068

[22] Filed: Nov. 18, 1987

Related U.S. Application Data

[63] Continuation of Ser. No. 648,897, Sep. 10, 1984, Pat. No. 4,719,676.

[51] Int. Cl.⁴ .............................................. B23B 3/30
[52] U.S. Cl. .................... 29/27 A; 29/26 A; 29/33 J; 408/37
[58] Field of Search .............. 82/1 C, 2 R, 2.5, 3, 82/36 A; 29/560, 560.1, 564, 27 A, 27 C, 35.5, 36, 39, 33 J; 408/20, 24, 36, 37

[56] References Cited

U.S. PATENT DOCUMENTS

| | | | |
|---|---|---|---|
| 943,467 | 12/1909 | Ruth | 408/37 |
| 1,037,935 | 9/1912 | Lauf et al. | 29/36 |
| 2,473,306 | 6/1949 | Schreiber | 82/3 |
| 4,457,193 | 7/1984 | Matthey | 82/3 |

FOREIGN PATENT DOCUMENTS

| | | | |
|---|---|---|---|
| 1196561 | 11/1959 | France | 82/1 C |
| 2413160 | 8/1979 | France | 82/3 |
| 24393 | 2/1977 | Japan | 29/564 |
| 56701 | 4/1983 | Japan | 82/3 |
| 186501 | 10/1983 | Japan | 82/3 |
| 95407 | 7/1922 | Switzerland | 408/238 |
| 643901 | 9/1950 | United Kingdom | 82/2.5 |
| 2025282 | 1/1980 | United Kingdom | 29/26 A |

Primary Examiner—Gil Weidenfeld
Assistant Examiner—Daniel W. Howell
Attorney, Agent, or Firm—Ralph W. Selitto, Jr.

[57] ABSTRACT

A flexible machining system includes a four axis double end slant bed unit which can be operated as a single or double spindle chucker, a precision boring machine, a way-type machine, a lathe or an automatic bar feeder. By providing the unit with a fifth axis, it may also function as a jig milling machine.

20 Claims, 7 Drawing Sheets

FLEXIBLE MACHINING SYSTEM

This is a continuation of application Ser. No. 648,897, filed Sept. 10, 1984, now U.S. Pat. No. 4,719,676.

FIELD OF THE INVENTION

The present invention relates to a flexible machining system, and, more particularly, to such a system which has the flexibility to function as a chucking, boring, milling, way-type and shaft machine.

BACKGROUND OF THE INVENTION

In the past, attempts have been made to develop machining systems which have increased flexibility. Thus, for example, in U.S. Pat. No. 4,457,193 there is disclosed a machining apparatus which includes two coaxial spindles. One spindle is mounted on a stationary headstock, while the other spindle is carried on a movable headstock, which is designed to permit the transfer of workpieces between the spindles. Vertical tool turrets are carried by slides mounted on opposite sides of the axis of rotation of the spindles. The slides and hence the vertical tool turrets can move in a direction parallel to the axis of rotation of the spindle. The vertical tool turrets can also move in a direction perpendicular to the axis of rotation of the spindles.

The machining apparatus of the '193 patent has the capability of permitting two tools to simultaneously perform machining operations on a workpiece mounted on either one of the spindles. Also, the apparatus has the capability of permitting a workpiece mounted in one spindle to be machined by a tool mounted in one turret, while another workpiece mounted in the other spindle is machined by a tool mounted in the other turret. Although these capabilities give the apparatus some degree of flexibility, the flexibility of the apparatus is limited. For instance, because the vertical turrets are adapted to hold tools only, the machining apparatus does not have the capability of functioning as a way-type machine in which workpieces would be mounted in place of the turrets and the spindles, equipped with appropriate tools, would be moved toward the workpiece to perform a machining operation thereon. The inability to mount workpieces between the spindles also eliminates the capability of simultaneously machining both ends of a single workpiece. Because the vertical turrets are not adapted to receive workpieces, the workpieces must be mounted in the spindles and the tools must be mounted in the turrets. As a result of such a design constraint, the machining operations which can be performed by the apparatus are limited to those operations which can be performed by a non-rating tool on a rotating workpiece. Inasmuch as the vertical turrets are permanently mounted on the slides, the apparatus does not have the flexibility to replace the vertical turrets with horizontal turrets or with a jig milling attachment.

SUMMARY OF THE PRESENT INVENTION

The shortcomings and disadvantages of the prior art machine described above are overcome in accordance with the present invention by providing a flexible machining system which includes first receiving means for releasably and rotatably receiving a workpiece or a tool, first mounting means for mounting the first receiving means such that the first receiving means is movable bidirectionally along a first axis, second receiving means for releasably and rotatably receiving a workpiece or a tool, second mounting means for mounting the second receiving means such that the second receiving means is movable bidirectionally along the first axis and such that the second receiving means is arranged coaxially relative to the first receiving means, third receiving means for releaseably receiving a workpiece or a tool, and third mounting means for mounting the third receiving means such that the third receiving means is movable bidirectionally along the first axis between the first and second receiving means and such that the third receiving means is movable bidirectionally along a second axis which is arranged perpendicular to the first axis. More particularly, the first receiving means can be a first spindle, the first mounting means can be a first slide, the second receiving means can be a second spindle, the second mounting means can be a second slide, and the third mounting means can be a third slide, which includes a main slide movable bidirectionally along the first axis and a cross slide mounted on the main slide for bidirectional movement relative thereto along the second axis.

In one exemplary embodiment of the present invention, the third receiving means is a modular horizontal tool turret, which is removably mounted on the cross slide for conjoint movement therewith along the first and second axes.

In a second exemplary embodiment, the third receiving means is a modular vertical tool turret, which is removably mounted on the cross slide for conjoint movement therewith along the first and second axes.

In a third exemplary embodiment, the third receiving means is a clamp removably mounted on the cross slide for conjoint movement therewith along the first and second axes. The clamp includes a pair of clamp members which cooperate with each other to releaseably clamp a workpiece to the cross slide.

In a fourth exemplary embodiment, the third receiving means is a jig milling slide removably mounted on the cross slide for conjoint movement therewith along the first and second axes. The jig milling slide also is movable bidirectionally along a third axis arranged nomral to a plane containing the first and second axes.

The four embodiments described above provide the present invention with the capability of operating as a single or double spindle chucker, a precision boring machine, a way-type machine, a lathe, an automatic bar feeder or a jig milling machine. Thus, the present invention offers the user a high degree of flexibility.

BRIEF DESCRIPTION OF THE DRAWINGS

For a more complete understanding of the present invention, reference is made to the following detailed description of four exemplary embodiments considered in conjunction with the accompanying drawings, in which.

DETAILED DESCRIPTION OF THE EXEMPLARY EMBODIMENTS

Figure 1:
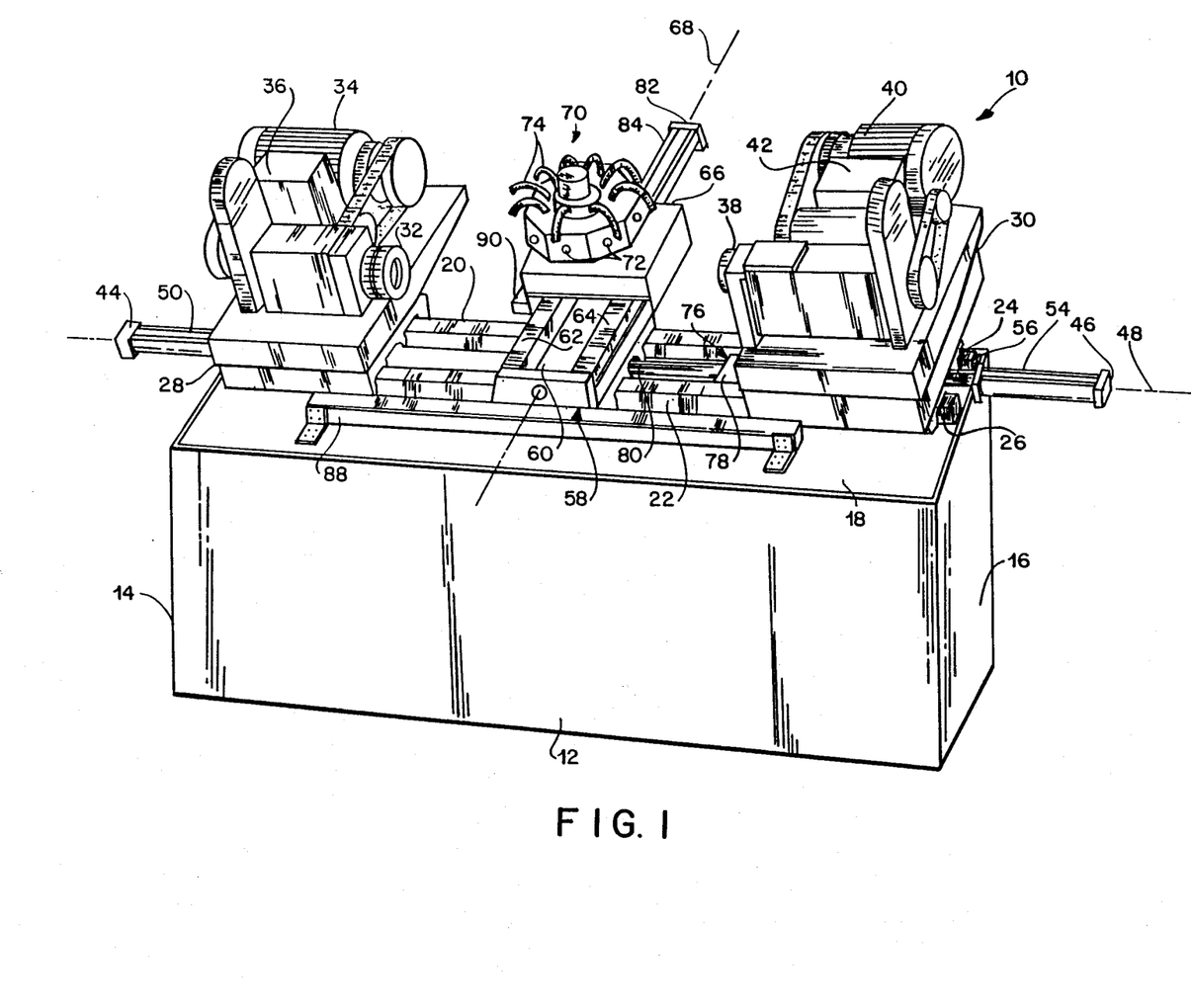
FIG. 1 is a perspective view of a first exemplary embodiment of a flexi ble machining system constructed in accordance with the present invention.
Figure 2:
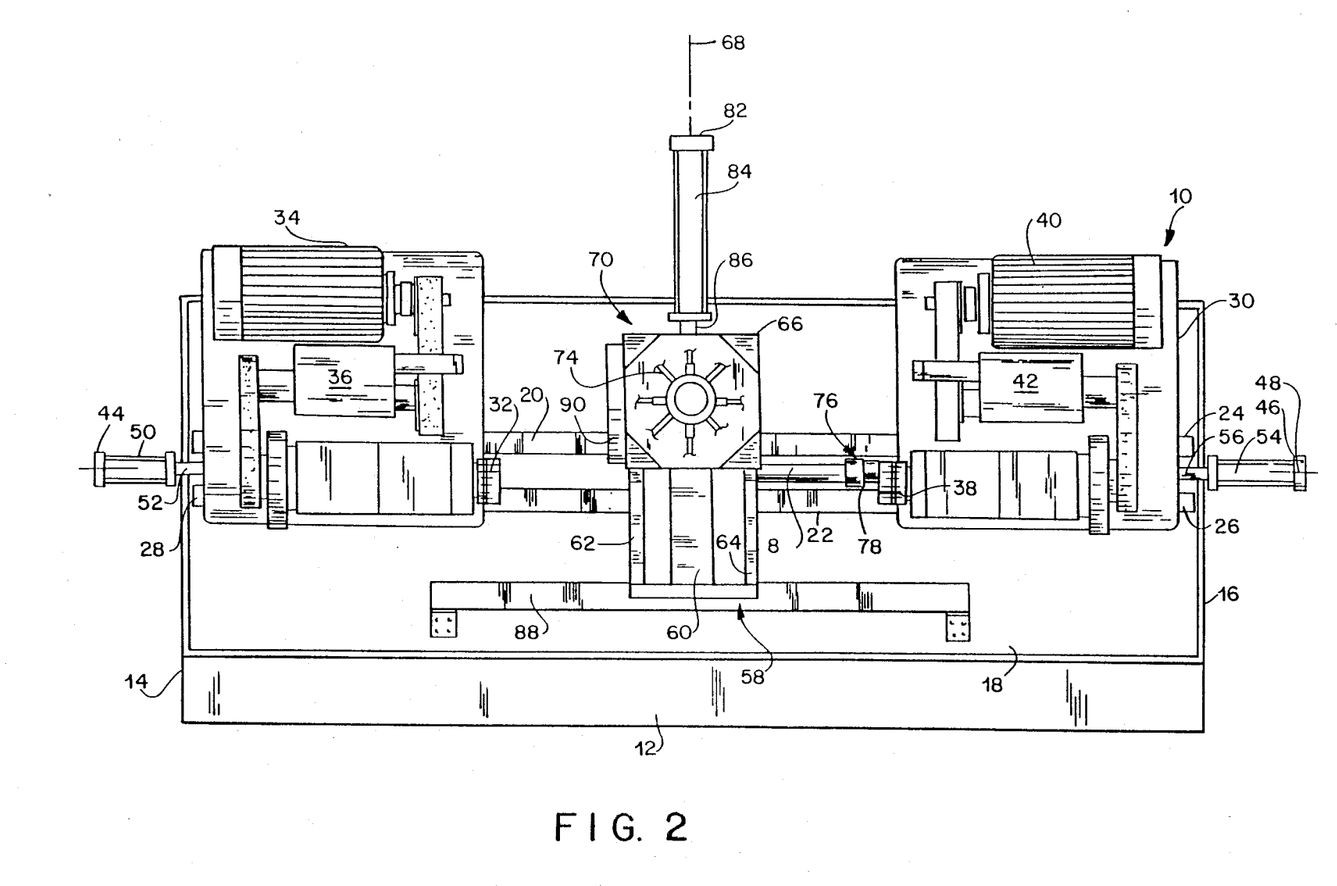
FIG. 2 is a top view, looking down at a slight angle relative to the vertical, of the flexible machining system illustrated in FIG. 1.

Referring to FIGS. 1 and 2, a flexible machining system 10 includes a base 12 of fabricated steel construction. The base 12 has a pair of ends 14, 16 and a slant bed 18. A pair of hardened and ground box-type ways 20, 22 extend across the bed 18. The way 20 is bolted and pinned to a beam 24 which extends along the bed 18 from the end 14 of the base 12 to the end 16 of the base 12. In addition to being bolted and pinned to a beam 26 which extends along the bed 18 from the end 14 of the base 12 to the end 16 of the base 12, the way 22 is keyed to the beam 26 so that it functions as a guide or register way.

End slides 28, 30 are movably mounted on the waya 20, 22 at the ends 14, 16, respectively, of the base 12. The end slide 28 carries a precision boring spindle 32, an AC motor 34 and a two-speed gear box 36, which cooperates with the motor 34 to rotate the spindle 32 at infinitely variable speeds. The end slide 30 carries a precision boring spindle 38, an AC motor 40 and a two-speed gear box 42, which cooperates with the motor 40 to rotate the spindle 38 at infinitely variable speeds. The end slides 28, 30 are mounted on the ways 20, 22 such that the spindles 32, 38 are arranged coaxially.

Hydraulic cylinders 44, 46 move the end slides 28, 30, respectively, along a Z axis 48 which is defined by the ways 20, 22 and which runs longitudinally of the bed 18. More particularly, the hydraulic cylinder 44 includes a casing 50, which is fixedly mounted on the end 14 of the base 12, and a piston 52 (see FIG. 2), which is attached to the slide 28. Thus, the position of the slide 28 along the Z axis 48 can be varied by retracting or extending the piston 52 of the hydraulic cylinder 44. Similarly, the hydraulic cylinder 46 includes a casing 54, which is fixedly mounted on the end 16 of the base 12, and a piston 56, which is attached to the slide 30. Thus, the position of the slide 30 along the Z axis 48 can be varied by retracting or extending the piston 56 of the hydraulic cylinder 46. If it is desired to temporarily fix the position of the end slides 28, 30 relative to the Z axis 48, they can be releasably locked by hydraulic clamps (not shown) to the ways 20, 22.

A central compound slide 58 is mounted for movement along the Z axis 48 between the end slides 28, 30. More particularly, the central slide 58 includes a main slide 60, which is mova bly mounted on the ways 20, 22. Two hardened and ground box-type ways 62, 64 are mounted on the main slide 60. The central slide 58 also includes a cross slide 66, which is mounted on the ways 62, 64 for movement along an X axis 68 which is defined by the ways 62, 64 and which runs transversely of the bed 18. A horizontal modular tool turret 70 is removably mounted on the cross slide 66 such that the turret 70 can be indexed bidirectionally. The turret 70 includes eight qualified tool positions 72 adapted to releaseably receive a tool holder (not shown) and a cutting tool (not shown). Liquid coolant can be supplied to the cutting location through cooling hoses 74, each of which is associated with a corresponding one of the tool positions 72. The turret 70, which is mechanically and hydraulically indexed, can be programmed such that the tool positions 72 may be randomly selected.

A hydraulic cylinder 76, which is mounted between the ways 20, 22, moves the central slide 58 along the Z axis 48 . More particularly, the hydraulic cylinder 76 includes a casing 78, which is fixedly attached to the bed 18 of the base 12, and a piston 80, which is attached to the main slide 60 of the central slide 58. Thus, the position of the main slide 60 and hence the central slide 58 along the Z axis 48 can be varied by retracting or extending the piston 80 of the hydraulic cylinder 76. If it is desired to fix the position of the central slide 58 relative to the Z axis 48, the main slide 60 can be releaseably locked to the ways 20, 22 by a hydraulic clamp (not shown). A hydraulic cylinder 82 moves the cross slide 66 along the X axis 68. More particularly, the hydraulic cylinder 82 includes a casing 84, which is fixedly attached to the main slide 60, and a piston 86 (see FIG. 2), which is attached to the ross slide 66. Thus, the position of the cross slide 66 along the X axis 68 can be varied by retracting or extending the piston 86 of the hydraulic cylinder 82. If it is desired to fix the position of the cross slide 66 relative to the X axis 68, the cross slide 66 can be releaseably locked to the ways 62, 64 by a hydraulic clamp (not shown).

A linear feedback tranducer 88 of one micron resolution is mounted on the bed 18. The transducer 88 has three homing positions in order to permit the precise positioning of either of the end slides 28, 30 or the central slide 58 along the Z axis 48. Another linear feedback transducer 90 of one micron resolution is mounted on the cross slide 66 in order to permit the precise positioning of the cross slide 66 along the X axis 68.

The embodiment illustrated in FIGS. 1 and 2 can be operated as a single end chucking machine or a double end chucking machine. As a single end chucking machine, a workpiece would be chucked in one of the spindles 32, 38 and one or more tools would be mounted in the turret 70. In order to permit the tool or tools to perform a machining operation on the workpiece, the central slide 58 would be mo ved along the Z axis 48 toward the spindle in which the workpiece is chucked. As a double end chucking machine, the turret 70 would be equipped with one tool adapted to perform a machining operation on a workpiece chucked in one of the spindles 32, 38 and with at least one other tool adapted to perform a mchining operation on a workpiece chucked in the other one of the spindles 32,38. In order to perform a machining operation on a workpiece chucked in the spindle 32, the central slide 58 would be moved in one direction along the Z axis 48 toward spindle 32. After the workpiece chucked in the spindle 32 has been machined, a machining operation could be performed on the workpiece chucked in the spindle 38 by moving the central slide 58 in an opposite direction along the Z axis 48 toward the spindle 38. Also, a single workpiece could be chucked in, for example, the spindle 32 for machining by one tool mounted in the turret 70. After its machining, the workpiece could be automatically transferred to the spindle 38 by moving the spindle 38 along the Z axis 48 toward the spindle 32. Upon chucking the workpiece in the spindle 38, the spindle 38 could e returned to its original position in preparation for the performance of another machining operation on the workpiece by an appropriate tool mounted in the turret 70. It should be understood that the workpiece can be transferred from the spindle 38 to the spindle 32, as well as from the spindle 32 to the spindle 38.

The embodiment of FIGS. 1 and 2 can also function as a lathe by having one of the spindles 32, 38 function as a headstock and the other function as a tailstock. A suitable tool would be mounted in the turret 70 and positioned so as to perform a machining operation on a workpiece as it is rotated by the spindles 32, 38.

By providing the spindles 32, 38 with through holes, the embodiment of FIGS. 1 and 2 could also function as an automatic bar feed machine in which a bar is fed through either one of the spindles 32, 38 to a tool carried by the turret 70. More particularly, after feeding the bar through, for example, the spindle 32, a suitable chuck in the spindle 32 would hold the bar in position as it is rotated and a tool mounted in the turret 70 is moved toward the bar to perform a machining operation thereon. After the machining operation has been completed, the central slide 58 could be moved away from the bar along the X axis 68 and the opposing spindle 38 could be moved into a position in which it grabs the bar. As the bar is held by the spindles 32, 38, a cutting tool held by the turret 70 can be moved along the X axis 68 to a position in which it severs the bar. The severed portion of the bar can then be transferred by the spindle 38 to a position in which another tool mounted in the turret 70 peforms a machining operation on an opposite end or unmachined area of the severed portion of the bar.

Five other exemplary embodiments of the present invention are illustrated in FIGS. 3, 4, 5, 6 and 7. Elements illustrated in FIGS. 3, 4, 5, 6 and 7 which correspond to the elements described above with respect to FIGS. 1 and 2 have been designated by corresponding even numbered reference numerals increased by one hundred, two hundred, three hundred, four hundred and five hundred, respectively, while new elements are designated by odd numbered reference numerals. The embodiments of FIGS. 3, 4, 5, 6 and 7 are constructed and operated in the same manner as the embodiment of FIGS. 1 and 2 unless it is otherwise stated.

Figure 3:
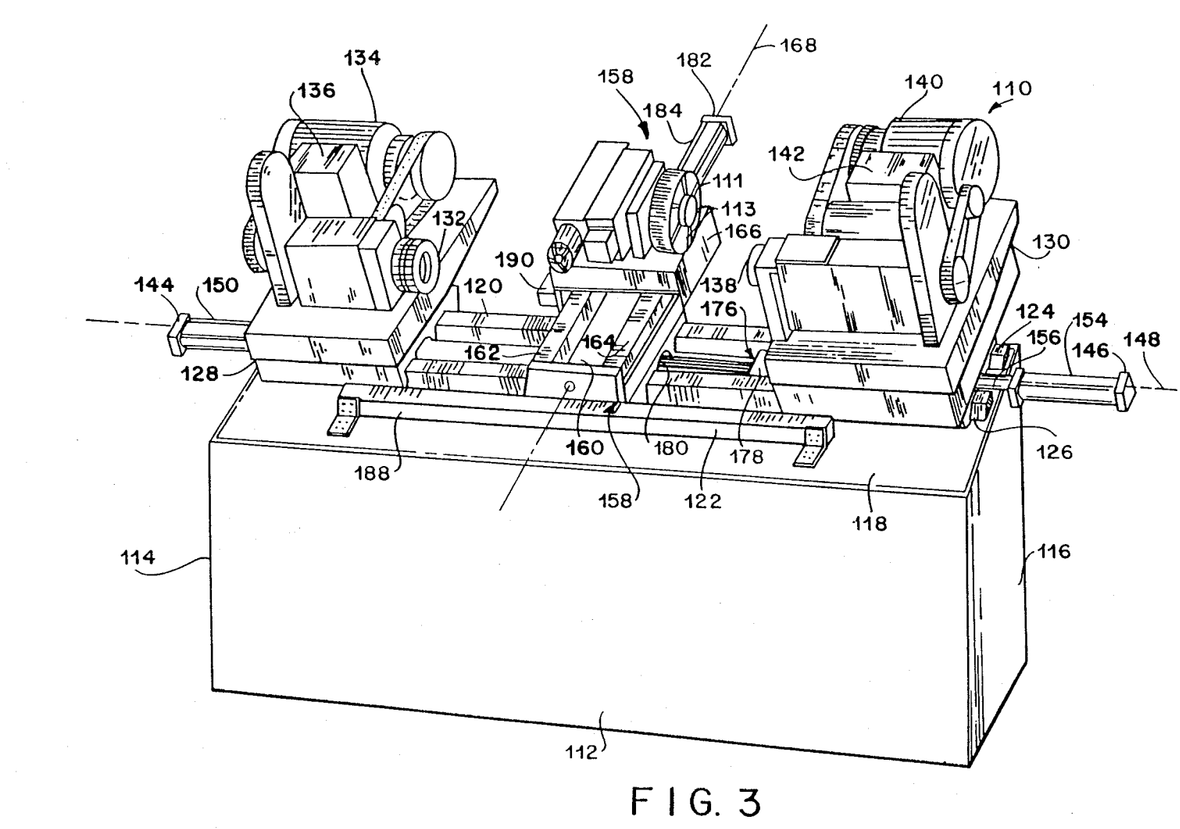
FIG. 3 is a perspective view of a second exemplary embodiment of a flexible machining system constructed in accordance with the present invention.

Referring now to FIG. 3, a central slide 158 is provided with a vertical modular tool turret 111, which can be indexed bidirectionally. The vertical turret 111 includes six qualified tool positions 113. Basically, the vertical turret 111 is adapted to perform the same machining operations which can be performed by the horizontal turret 70 of the embodiment of FIGS. 1 and 2. One reason for replacing the horizontal turret 70 with the vertical turret 111 is to obtain additional clearance.

Figure 4:
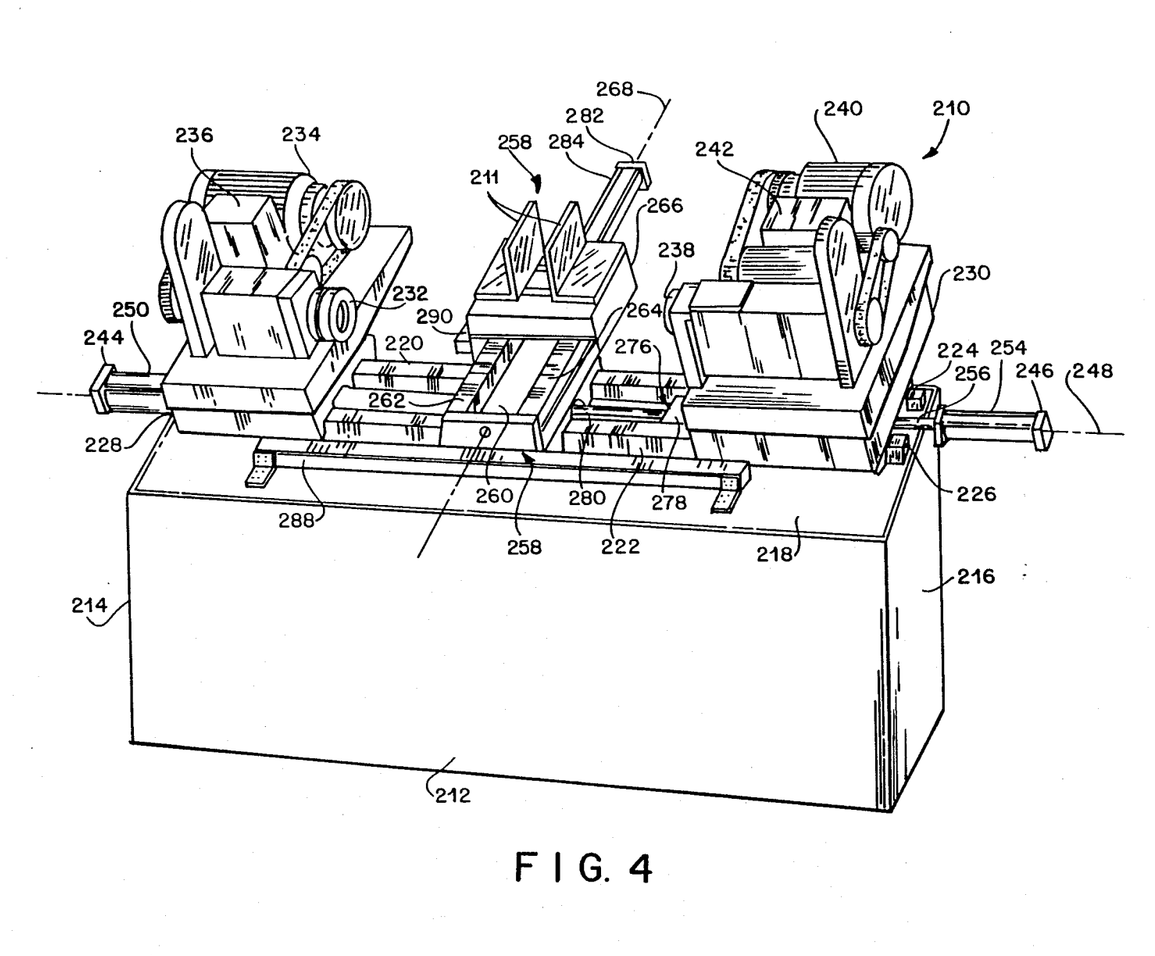
FIG. 4 is a perspective view of a third exemplary embodiment of a flexible machining system constructed in accordance with the present invention.

With reference to FIG. 4, a central slide 258 is provided with an automatic hydraulically-operated clamp 211 adapted to non-rotatably hold a workpiece. By mounting a suitable tool in a spindle 232 and moving the workpiece toward the tool, a machining operation can be performed on the workpiece. If another tool is mounted in a spindle 238, the workpiece can be subjected to a second machining operation by moving it away from the spindle 232 and toward the spindle 238. The embodiment of FIG. 4 can also function as a way-type machine by maintaining the central slide 258 stationary and moving the spindles 232, 238 toward the central slide 258, whereby two machining operations may be simultaneously or successively performed on the opposing ends of the workpiece.

Figure 5:
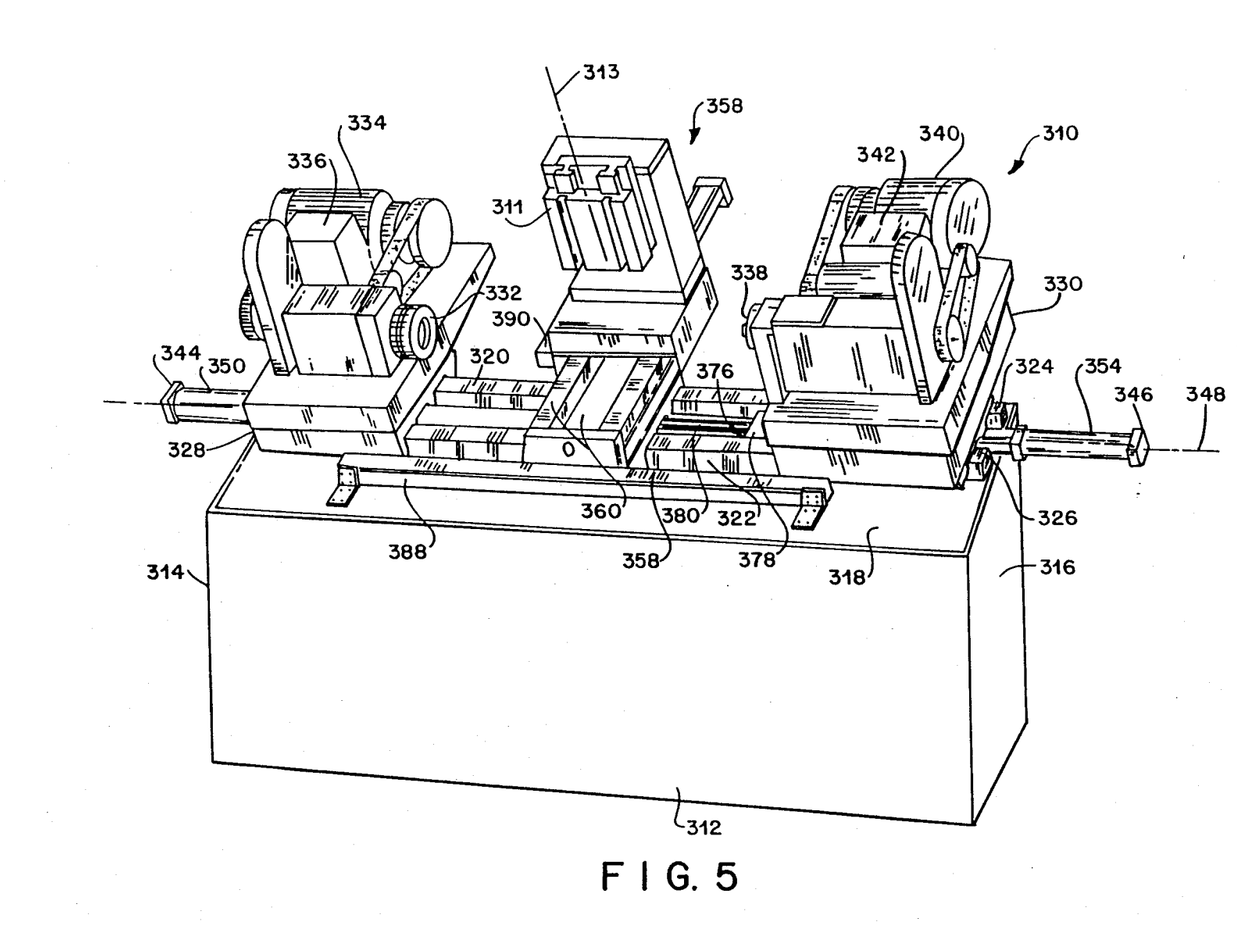
FIG. 5 is a perspective view of a fourth exemplary embodiment of a flexible machining system constructed in accordance with the present invention.

Referring now to FIG. 5, a central slide 358 is provided with a vertical slide 311 adapted to be moved up and down along a Y axis 313, which is normal to a plane containing a Z axis 348 and arranged parallel to ways 320, 322, by a hydraulic cylinder (not shown). This embodiment permits a jig milling operation to be performed by mounting a tool in the slide 311 and a workpiece in one of two spindles 332, 338. Alternatively, the slide 311 could hold the workpiece, while the tool is held in one of the spindles 332, 338.

Figure 6:
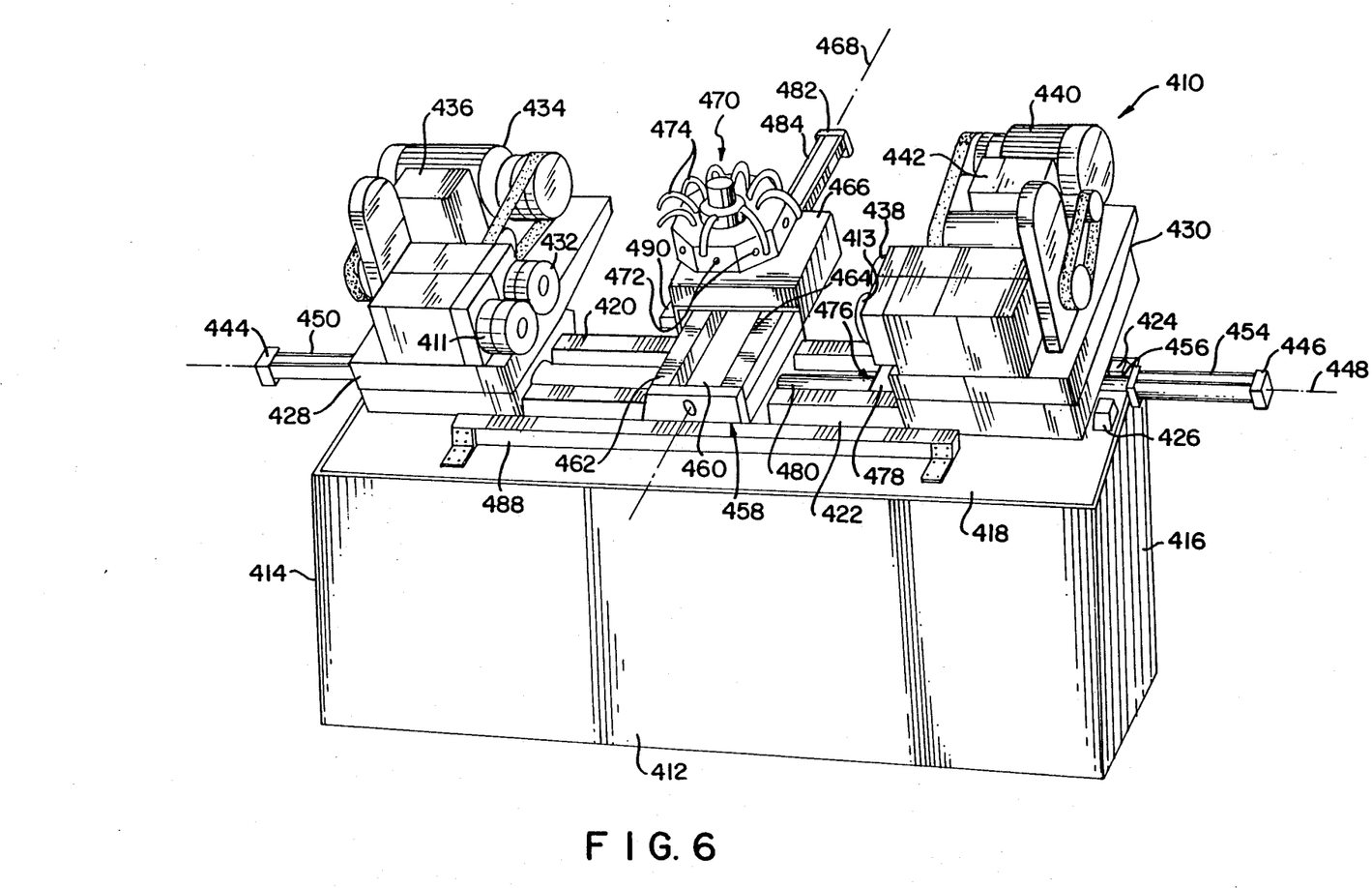
FIG. 6 is a perspective view of a fifth exemplary embodiment of a flexible machining system constructed in accordance with the present invention.

With reference to FIG. 6, a spindle 411 is mounted next to a spindle 432, while a spindle 413 is mounted next to a spindle 438. The spindles 411, 413 are essentially identical to the spindles 432, 438.

Figure 7:
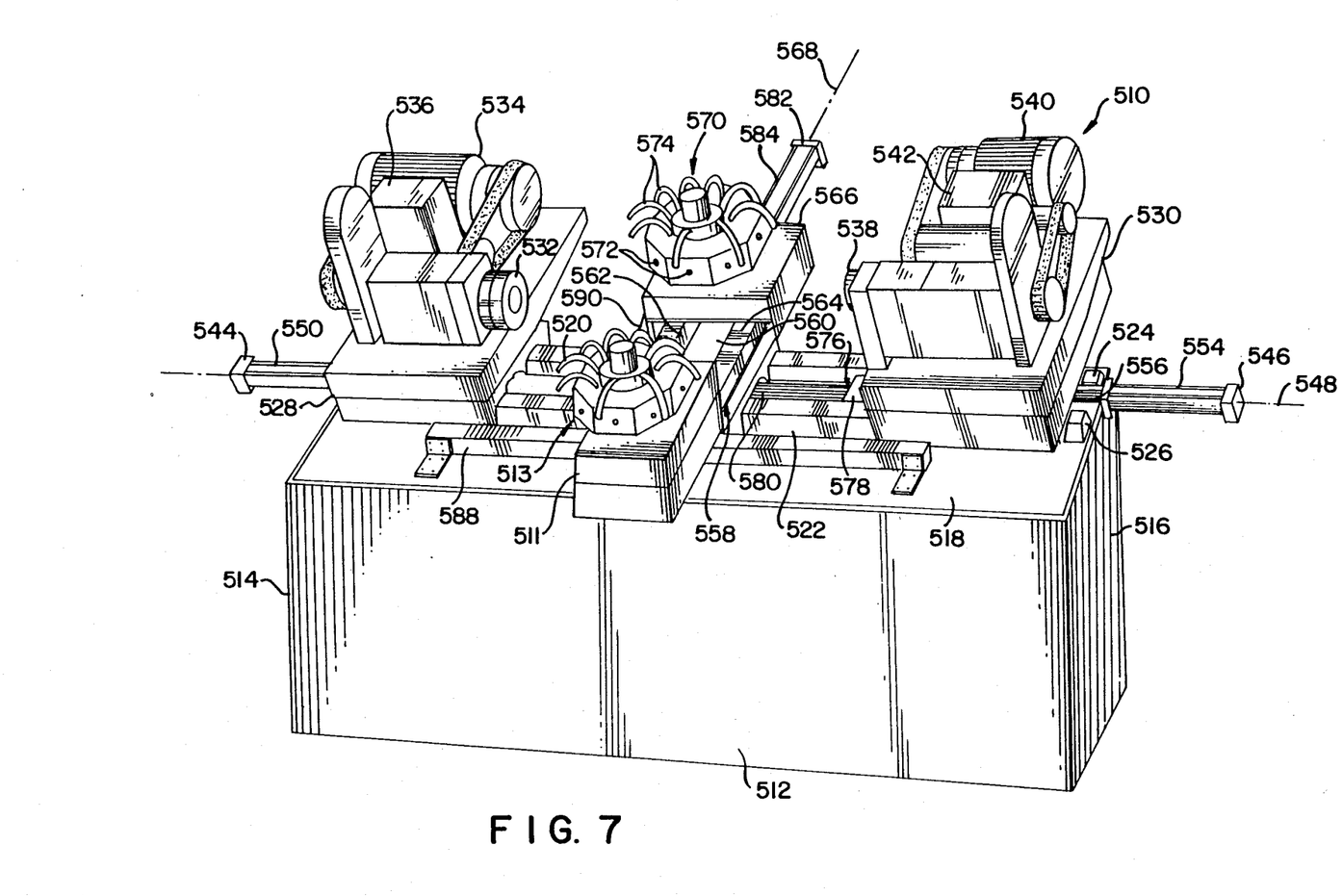
FIG. 7 is a perspective view of a sixth exemplary embodiment of a flexible machining system constructed in accordance with the present invention.

Referring now to FIG. 7, a central slide 558 is provided with a cross slide 566, as well as a cross slide 511. A horizontal modular tool turret 570 is mounted on the cross slide 566, while another horizontal modular tool turret 513 is mounted on the cross slide 511. The tool turret 513 is essentially identical to the tool turret 570.

During the operation of all six of the embodiments described above, all machine movements along the various axes are numerically controlled by a computer. The direction and speed of rotation of the spindles are also numerically controlled by the computer. In addition, all metal cutting functions or operations are under the same computerized control.

It will be understood that the embodiments described herein are merely exemplary and that a person skilled in the art may make many variations and modifications without departing from the spirit and scope of the invention. All such modifications and variations are intended to be included within the scope of the invention as defined in the appended claims.

I claim:

1. A flexible machining system, comprising first adjustable receiving means for interchangeably and rotatably receiving workpieces or tools, whereby a tool received in said first receiving means can be removed therefrom and replaced with a workpiece or vice versa; first rotating means for rotating said first receiving means; first mounting means for mounting said first receiving means such that said first receiving means is movable bidirectionally along a first axis; second adjustable receiving means for interchangeably and rotatably receiving workpieces or tools, whereby a tool received in said second receiving means can be removed therefrom and replaced with a workpiece or vice versa; second rotating means for rotating said second receiving means; second mounting means for mounting said second receiving means such that said second receiving means is movable bidirectionally along said first axis and such that said second receiving means is arranged coaxially relative to said first receiving means; third receiving means for releaseably receiving a workpiece or a tool; third mounting means for mounting said third receiving means such that said third receiving means is movable bidirectionally along said first axis between said first and second receiving means and such that said third receiving means is movable bidirectionally along a second axis which is arranged perpendicular to said first axis, said third mounting means including a main slide movable bidirectionally along said first axis and a cross slide mounted on said main slide for bidirectional movement relative thereto along said second axis, said cross slide including attaching means for removably and interchangeably attaching a horizontal tool turret, a vertical tool turret, a workpiece holder of a jig milling slide to said cross slide such that said horizontal tool turret, said vertical tool turret, said workpiece holder or said jig milling slide functions as said third receiving means when attached to said cross slide, whereby said system has the flexibility to perform numerous diverse machining operatons; supporting means for supporting said first, second and third mounting means such that said first, second and third mounting means are movable bidirectionally and independently of each other along said supporting means, said supporting means including a single way system common to said first, second and third mounting means such that each of said first second and third mounting means is supported by said way system; first moving means for bidirectionally moving said first mounting means along said way system between a first position in which said first mounting means is remote from said third mounting means and a second position in which said first mounting means is adjacent one side of said third mounting means; second moving means for bidirectionally moving said second mounting means along said way system between a third position in which said second mounting means is remote from said third mounting means and a fourth position in which said second mounting means is adjacent an opposite side of said first mounting means, whereby when said first mounting means is in said second position and said second mounting means is in said fourth position said first and second receiving means are close enough to each other such that workpieces can be transferred from said first receiving means to said second receiving means or vice versa; third moving means for bidirectionally moving said main slide along said way system between said first and second mounting means; and fourth moving means for bidirectionally moving said cross slide along said second axis.

2. A flexible machining system according to claim 1, wherein said first receiving means includes a first spindle, said first mounting means includes a first slide, said second receiving means includes a second spindle, said second mounting means includes a second slide, and said third mounting means includes a third slide, said third slide including a main slide movable bidirectionally along said first axis and a cross slide mounted on said main slide for bidirectional movement relative thereto along said second axis.

3. A flexible machining system according to claim 2, wherein said third receiving means is a modular horizontal tool turret, said turret being removably mounte on said cross slide for conjoint movement therewith along said first and second axes.

4. A flexible machining system according to claim 2, wherein said third receiving means is a modular vertical tool turret, said turret being removably mounted on said cross slide for conjoint movement therewith along said first and second axes.

5. A flexible machining system according to claim 2, wherein said third receiving means is a clamp removably mounted on said cross slide for conjoint movement therewith along said first and second axes, said clamp including a pair of clamp members which cooperate with each other to releaseably clamp a workpiece to said cross slide.

6. A flexible maching system according to claim 2, wherein said third receiving means is a jig milling slide removably mounted on said cross slide for conjoint movement therewith along said first and second axes, said jig milling slide also being movable bidirectionally along a third axis arranged normal to a plane containing said first and second axes.

7. A flexible machining system according to claim 1, wherein said main slide includes another way system, said cross slide being mounted on said another way system for bidirectonal movement relative to said main slide along said second axis.

8. A flexible machining system according to claim 1, wherein said first moving means is a first hydraulic cylinder, said second moving means is a second hydraulic cylinder, said third moving means is a third hydraulic cylinder and said fourth moving means is a fourth hydraulic cylinder.

9. A flexible machining system according to claim 8, wherein said first, second, third and fourth hydraulic cylinders are numerically controlled by a computer.

10. A flexible machining system according to claim 2, wherein said first and second spindles include through holes, whereby said first and second spindles are adapted for automatic bar feeding.

11. A flexible machining system according to claim 1 wherein said way system includes a pair of ways carried by a slant bed.

12. A flexible machining system according to claim 1, wherein said first receiving means includes a plurality of spindles and said second receiving means includes a plurality of spindles.

13. A flexible machining system according to claim 1, wherein said first and second mounting means are alternately or simultaneously movable along said way system toward and away from said third mounting means.

14. A flexible machining system according to claim 1, further comprising first locking means for locking said first mounting means in a predetermined position along said way system, second lockding means for locking said second mounting means in a predetermined position along said way system, and third locking means for locking said third mounting means in a predetermined position along said way system.

15. A flexible machining system according to claim 1, further comprising positioning means for automatically positioning said first, second and third mounting means along said first axis.

16. A flexible maching system according to claim 15, wherein said positioning means is a linear feedback transducer.

17. A flexible machining system according to claim 1, further comprising fourth receiving means for releasably receiving a workpiece or a tool and fourth mounting means for mounting said fourth receiving means such that said fourth receiving means is movable bidirectionally along said first axis between said first and second receiving means and such that said fourth receiving means is movable bidirectionally along said second axis, said third receiving means interchangeably receiving workpieces and tools and said fourth receiving means interchangeably receiving workpieces and tools.

18. A flexible machining system according to claim 1, wherein said third receiving means is positioned along said second axis such that said third receiving means is not between said first and second receiving means when said first and second mounting means are in said second and fourth positions, respectively, whereby said third receiving means does not interfere with the transfer of workpieces between said first and second receiving means.

19. A flexible machining system according to claim 1, wherein said first mounting means can be positioned at any one of an infinite number of locations between said first and second positions and said second mounting means can be positioned at any one of an infinite number of locations between said third and fourth positions.

20. A flexible machining system according to claim 1, wherein said first and second mounting means can be positioned close enough to said third mounting means so as to permit tools received in said first and second receiving means to simultaneously perform machining operations on a workpiece received in said third receiving means when said third receiving means is positioned along said second axis such that said third receiving means is between said first and second receiving means.

* * * * *